(12) United States Patent
Tomiyasu et al.

(10) Patent No.: US 6,759,138 B2
(45) Date of Patent: Jul. 6, 2004

(54) ANTIFERROMAGNETICALLY COUPLED MAGNETIC RECORDING MEDIUM WITH DUAL-LAYERED UPPER MAGNETIC LAYER

(75) Inventors: Hiroshi Tomiyasu, Tokyo (JP); Keiji Moroishi, Singapore (SG); Teiichiro Umezawa, Tokyo (JP); Kenji Ayama, Singapore (SG)

(73) Assignees: Hoya Corporation, Tokyo (JP); Hoya Magnetics Singapore PTE, Ltd., Singapore (SG)

( * ) Notice: Subject to any disclaimer, the term of this patent is extended or adjusted under 35 U.S.C. 154(b) by 0 days.

(21) Appl. No.: 10/186,723

(22) Filed: Jul. 2, 2002

(65) Prior Publication Data

US 2003/0104248 A1 Jun. 5, 2003

(30) Foreign Application Priority Data

Jul. 3, 2001 (JP) ........................................ 2001-202724

(51) Int. Cl.[7] ................................................. G11B 5/66
(52) U.S. Cl. ..................... 428/611; 428/637; 428/666; 428/667; 428/668; 428/669; 428/678; 428/141; 428/213; 428/409; 428/694 TS; 428/694 TM; 428/694 TR
(58) Field of Search ................................ 428/611, 636, 428/637, 668, 669, 678, 663, 666, 667, 141, 212, 213, 409, 694 TS, 694 TM, 694 TR, 900

(56) References Cited

U.S. PATENT DOCUMENTS

| | | | | |
|---|---|---|---|---|
| 4,722,869 A | * | 2/1988 | Honda et al. ............... | 428/611 |
| 6,166,948 A | * | 12/2000 | Parkin et al. ............... | 365/173 |
| 6,383,668 B1 | * | 5/2002 | Fullerton et al. ..... | 428/694 TM |
| 6,504,665 B1 | * | 1/2003 | Mukasa et al. ............... | 360/55 |
| 2001/0051287 A1 | * | 12/2001 | Kikitsu et al. ........ | 428/694 ML |
| 2002/0028357 A1 | * | 3/2002 | Shukh et al. ......... | 428/694 TM |
| 2002/0045071 A1 | * | 4/2002 | Mukai .................. | 428/694 TS |
| 2002/0098390 A1 | * | 7/2002 | Do et al. ................ | 428/694 TS |
| 2002/0122960 A1 | * | 9/2002 | Hanawa et al. ......... | 428/694 TS |
| 2003/0022025 A1 | * | 1/2003 | Futamoto et al. ..... | 428/694 TM |

FOREIGN PATENT DOCUMENTS

JP 2001-56293 2/2001

* cited by examiner

Primary Examiner—Ramsey Zacharia
Assistant Examiner—Kevin M Bernatz
(74) Attorney, Agent, or Firm—Sughrue Mion, PLLC

(57) ABSTRACT

In a magnetic recording medium which includes a base body (1-4), first and second magnetic layers (5 and 7), each being of a ferromagnetic material, and a spacer layer (6) formed between the first and the second magnetic layers for inducing antiferromagnetic exchange interaction between the first and the second magnetic layers, the second magnetic layer located farther from the base body than the first magnetic layer includes a primary layer (72) and a secondary layer (71) located nearer to the base body than the primary layer. The primary layer has a primary anisotropic magnetic field while the secondary layer has a secondary anisotropic magnetic field which is smaller than the primary anisotropic magnetic field. The first magnetic layer is for controlling the antiferromagnetic exchange interaction.

12 Claims, 4 Drawing Sheets

ANTIFERROMAGNETICALLY COUPLED MAGNETIC RECORDING MEDIUM WITH DUAL-LAYERED UPPER MAGNETIC LAYER

BACKGROUND OF THE INVENTION

This invention relates to a magnetic recording medium for use with a magnetic disk apparatus for carrying out information recording and reproducing operations.

In order to achieve an increase in recording density of a HDD (hard disk drive), a decrease in medium noise is indispensable. In the past, the decrease in medium noise is achieved by improving a film structure or a film material of a magnetic recording medium in order to reduce a product Mr·t of the magnetic disk, with the help of uninterrupted improvement in output characteristics of a magnetic head. The product Mr·t is a product of residual magnetization (Mr) of a magnetic layer of the magnetic disk and a film thickness (t) of the magnetic layer of the magnetic disk.

The reduction in Mr·t is extremely effective in improving R/W (read/write) characteristics but simultaneously causes a problem of a thermal decay characteristic. The decrease in Mr·t, i.e., the decrease in film thickness of a magnetic layer brings about miniaturization of the grain size of the magnetic layer, resulting in reduction of the medium noise. However, miniaturized crystal grains no longer have a coercive force (Hc) sufficient to hold recorded magnetization as a recorded signal. This results in a phenomenon that the recorded signal is attenuated. This phenomenon is called thermal decay.

In order to prevent the phenomenon (thermal decay) that the recording signal is attenuated, various film structures have been proposed. Attention is recently attracted to one of the film structures which is called an AFC (Anti-Ferro-Coupled-film) structure (see Japanese Unexamined Patent Publication No. 56923/2001 (JP 2001-56293 A)).

A magnetic recording medium disclosed in Japanese Unexamined Patent Publication No. 56923/2001 has a multilayer structure in which a magnetic layer is divided by a nonmagnetic separation layer (Ru, Rh, Ir, or the like) into upper and lower magnetic layers. Specifically, the magnetic layer is divided by the nonmagnetic separation layer into a plurality of magnetic layers having magnetizing directions parallel to one another. Thus, the thermal decay characteristic is improved.

However, a film using the AFC structure is increased in magnetic layer thickness in total due to its structure although the thermal decay characteristic is excellent. The increase in magnetic layer thickness results in a decrease in coercive force squareness ratio (S*). In addition, the pulse width (PW) and the overwrite characteristic are deteriorated. The increase in magnetic layer thickness also results in an increase in grain size of the magnetic layer so that the medium noise (S/N ratio) is deteriorated. Thus, such recording/reproducing characteristics do not fully satisfy recent demands in an increase in recording density.

SUMMARY OF THE INVENTION

It is therefore an object of this invention to provide a magnetic recording medium which is excellent in thermal decay characteristic and in recording/reproducing characteristics such as a coercive force squareness ratio (S*), a pulse width, an overwrite characteristic, and medium noise (S/N ratio).

Magnetic recording media according to this invention are as follows.

1) A magnetic recording medium comprising a base body, a first magnetic layer formed on the base body, a second magnetic layer, and a spacer layer formed between the first and the second magnetic layers, each of the first and the second magnetic layers being of a ferromagnetic material, the spacer layer being for inducing antiferromagnetic exchange interaction between the first and the second magnetic layers, the first magnetic layer being for controlling the antiferromagnetic exchange interaction, the second magnetic layer comprising a primary layer and a secondary layer located nearer to the base body than the primary layer, the primary layer having a primary anisotropic magnetic field, the secondary layer having a secondary anisotropic magnetic field which is smaller than the primary anisotropic magnetic field.

2) A magnetic recording medium as mentioned in the paragraph 1), wherein the secondary layer has a thickness smaller than that of the primary layer.

3) A magnetic recording medium as mentioned in the paragraph 1), wherein the secondary layer has a saturated magnetic flux density smaller than that of the primary layer.

4) A magnetic recording medium as mentioned in the paragraph 1), wherein the spacer layer has a surface roughness Rmax of 6 nm or less and another surface roughness Ra of 0.6 nm or less, where Rmax is defined as a maximum height representative of a difference between a highest point and a lowest point and where Ra is representative of a center-line-mean roughness.

5) A magnetic recording medium as mentioned in the paragraph 1), wherein the spacer layer is made of a material comprising Ru. 6) A magnetic recording medium as mentioned in the paragraph 1), wherein the base body comprises a substrate and an underlying layer formed between the substrate and the first magnetic layer. 7) A magnetic recording medium as mentioned in the paragraph 6), wherein the underlying layer comprises an intermediate layer having an hcp (hexagonal close-packed) structure.

8) A magnetic recording medium as mentioned in the paragraph 7), wherein the intermediate layer is formed so that crystal matching or alignment with the primary magnetic layer is improved away from the substrate towards the primary magnetic layer.

9) A magnetic recording medium as mentioned in the paragraph 7), wherein the intermediate layer comprises a plurality of layers.

10) A magnetic recording medium as mentioned in the paragraph 9), wherein one layer of the plurality of layers of the intermediate layer, that is nearest to the first magnetic layer, is made of a ferromagnetic material.

11) A magnetic recording medium as mentioned in the paragraph 6), wherein the substrate is a glass substrate.

12) A magnetic recording medium as mentioned in the paragraph 6), wherein the base body further comprises a precoat layer formed between the substrate and the underlying layer for controlling crystal grains of the first and the second magnetic layers.

13) A magnetic recording medium as mentioned in the paragraph 12), wherein the precoat layer is made of an alloy comprising Cr and Ta.

As described above, the second magnetic layer comprises a plurality of layers including the primary and the secondary layers. In this case, as compared with the case where the second magnetic layer comprises a single layer, a thermal decay characteristic is improved and, simultaneously, a coercive force squareness ratio (S*) and a pulse width (PW) are improved.

As described above, the secondary layer located nearer to the base body than the primary layer has a thickness smaller than that of the primary layer. With this structure, the primary layer relatively thick and located farther from the base body mainly has magnetic recording/reproducing functions while the secondary layer relatively thin and located nearer to the base body has a function of preventing the disturbance in crystal orientation in case where the primary layer is directly formed on the spacer layer.

Specifically, the primary layer having a thickness suitable for magnetic recording/reproducing operations and the spacer layer are not always have lattice constants approximate to each other. Therefore, by providing an additional layer (namely, the secondary layer) having a lattice constant approximate to those of the spacer layer and the primary layer suitable for the magnetic recording/reproducing operations, the difference in lattice constant between the above-mentioned layers can be reduced. The additional layer (the secondary layer) is mainly intended to approximate (match) the lattice constants. Therefore, the additional layer (the secondary layer) is preferably thin. By matching the lattice constants, the disturbance in crystal orientation is suppressed as compared with the case where the primary layer is directly formed on the spacer layer. As a result, the coercive force squareness ratio (S*) and the pulse width (PW) can be improved.

In this case, however, if the secondary layer having an excessively large anisotropic magnetic field is selected as the additional thin layer in order to match the lattice constants, the antiferromagnetic exchange interaction between the first magnetic layer made of a ferromagnetic material controlling the antiferromagnetic exchange interaction and the second magnetic layer may be impeded so that the thermal decay characteristic is deteriorated. In order to avoid such disadvantage, the anisotropic magnetic field of the additional thin layer (namely, the secondary layer) nearer to the substrate must be smaller than that of the thick layer (namely, the primary layer) adjacent to the additional thin layer. Specifically, the crystal orientation is improved and, simultaneously, the antiferromagnetic exchange interaction between the first magnetic layer and the second magnetic layer is not easily affected by the anisotropic magnetic field of the additional thin layer (namely, the secondary layer). Thus, the thermal decay characteristic is improved while the coercive force squareness ratio (S*) and the pulse width (PW) are improved.

Herein, the anisotropic magnetic field of the additional thin layer or the secondary layer (which will be referred to as a lower magnetic layer) or the thick layer or the primary layer (which will be referred to as an upper magnetic layer) can be adjusted by controlling the content of Pt contained in the lower magnetic layer or the upper magnetic layer. A smaller anisotropic magnetic field of the lower magnetic layer than that of the upper magnetic layer can be achieved if the content of Pt in the lower magnetic layer is smaller than that in the upper magnetic layer. Specifically, the content of Pt contained in the lower or the upper magnetic layer is adjusted within a range between 5 and 14 at % (namely, atomic percentages).

By arranging the lower magnetic layer of a small thickness between the spacer layer and the upper magnetic layer, it is possible to prevent the disturbance in crystal orientation in case where the upper magnetic layer is directly formed on the spacer layer. Presumably, this is because the matching in lattice constant between the lower and the upper magnetic layers is improved as described above. As a consequence, the coercive force squareness ratio (S*) and the pulse width (PW) are improved. On the other hand, however, the medium noise (S/N ratio) and the thermal decay characteristic may sometimes be degraded. One of factors causing the degradation in medium noise (S/N ratio) is as follows. The lower magnetic layer mismatching in lattice constant from the spacer layer contains the disturbance in crystal orientation. Therefore, an increase in thickness of the lower magnetic layer causes an increase in noise. Taking the above into consideration, the lower magnetic layer is desired to be as thin as possible, keeping the effect of improving the orientation of the upper magnetic layer.

According to the studies of the present inventors, it has been found out that a smaller saturated magnetic flux density of the lower magnetic layer than that of the upper magnetic layer serves to reduce a noise source of the lower magnetic layer to thereby improve the medium noise (S/N ratio). As a consequence, the coercive force squareness ratio (S*) is improved while the pulse width (PW), the overwrite characteristic, the medium noise (S/N ratio), and the thermal decay characteristic can be improved.

It is noted here that the saturated magnetic flux density of the lower or the upper magnetic layer can be adjusted, for example, by controlling the content of Cr contained in the lower or the upper magnetic layer. A smaller saturated magnetic flux density of the lower magnetic layer than that of the upper magnetic layer can be achieved if the content of Cr contained in the lower magnetic layer is greater than that in the upper magnetic layer. Specifically, the content of Cr contained in the lower or the upper magnetic layer is adjusted within a range between 14 and 24 at %.

In this case, the lower magnetic layer has a thickness within a range between 5 and 80 angstroms, which is preferable in preventing serious deterioration of the S/N ratio. The thickness of the upper magnetic layer is appropriately adjusted in correspondence to a desired value of Mr·t. The second magnetic layer may comprise two layers, three layers, four or more layers. In view of the production cost, two or three layers are preferable.

As a material of the lower magnetic layer, use may be made of a Co-based alloy such as CoCrPtTa, CoCrTa, CoCrPt, CoPt, CoPtTa, CoCrPtTaB, CoCrPtB, and CoCr (Cr<22 at %).

Particularly, use of CoCrPtTa as the lower magnetic layer is preferable because the S/N ratio is improved.

For miniaturization of crystal grains in order to further reduce the medium noise, an element or elements such as O, N, C, H, and $H_2O$ may be added to the lower magnetic layer. These elements can be added to the lower magnetic layer using various methods. For example, use may be made of a method of depositing the lower magnetic layer by sputtering in an inactive gas atmosphere using a target containing these elements, a method of depositing the lower magnetic layer by reactive sputtering in a mixed gas atmosphere obtained by mixing $O_2$, $N_2$, NO, $NO_2$, or $CH_4$ and an inactive gas, and so on. In this case, it is preferable that these elements are not excessively added. This is because the addition of these elements as a gas decreases the magnetization of the lower magnetic layer so that the lower magnetic layer does not simultaneously serve as both an orientation control layer and a magnetic layer. The concentration of the gas to be added preferably falls within a range between 0.1 and 2%, more preferably between 0.25 and 1%.

As a material of the upper magnetic layer, use may be made of a Co-based alloy such as CoCrPtB, CoCrPtTaB, CoCrPtTa, CoCrPt, CoCrTa, and CoCr (Cr<22 at %). Particularly, CoCrPtB containing Co, Pt, and B is preferable because a high coercive force (Hc) and a high S/N characteristic are achieved.

As a material of the first magnetic layer, use may be made of a Co-based alloy such as CoCr (Cr<22at %), CoCrPt, CoCrPtB, CoCrPtTa, CoCrPtTaB, CoCrTa, and CoCrRu. The thickness of the first magnetic layer is appropriately adjusted in correspondence to a desired level of the thermal decay characteristic. Specifically, the thickness of the first magnetic layer falls within a range between 5 and 80 angstroms.

Among the above-mentioned materials of the first magnetic layer, use of CoCr is preferable because the thermal decay characteristic can be improved.

In this invention, the spacer layer preferably has a surface roughness Rmax of 6 nm or less and another surface roughness Ra of 0.6 nm or less. The surface roughnesses referred to herein are specified by Japan Industrial Standard JISB0601 in the manner which will later be described. The action of the spacer layer inducing the antiferromagnetic exchange interaction greatly depends upon the thickness of the spacer layer. It has been found out that, if the surface roughness of the spacer layer is great, variation arises in the antiferromagnetic exchange interaction between the first and the second magnetic layers. In this event, the antiferromagnetic exchange interaction within a plane of the magnetic recording medium exhibits a distribution so that in-plane distribution of the thermal decay is caused. Specifically, it has been found out that, if the spacer layer has a surface roughness given by Rmax of 6 nm or less and Ra of 0.6 nm or less, the above-mentioned variation (distribution) is suppressed.

In order to obtain a predetermined surface roughness of the spacer layer, use is preferably made of a substrate which is mirror-polished to have the predetermined surface roughness or less. Thus, the surface roughness of the spacer layer can easily be adjusted to the predetermined level.

In this invention, it is preferable to use the substrate mirror-polished into Rmax of 6 nm or less and Ra of 0.6 nm or less.

As a material of the spacer layer, use may be made of Ru, Rh, Ir, and an alloy thereof, such as CoRu and NiRu. The thickness of the spacer layer is appropriately adjusted within a range such that the antiferromagnetic exchange interaction is obtained. Specifically, the thickness falls within a range between 4 and 10 angstroms, preferably between 7 and 9 angstroms. Particularly, use of Ru as a material of the spacer layer is preferable because antiferromagnetic exchange interaction is great.

Generally, the magnetic recording medium has a structure in which the underlying layer is formed between the substrate and the first magnetic layer. As the underlying layer, a plurality of layers including an intermediate layer having an hcp (hexagonal close-packed) structure, a lower layer having a bcc (body-centered cubic) structure, a seed layer, and so on may be formed in this order from the side of the first magnetic layer towards the substrate. Alternatively, the underlying layer may be a single layer selected from these layers.

The intermediate layer has an hcp (hexagonal close-packed) structure and is intended to adjust the crystal orientation of the magnetic layer having the hcp structure. For example, the intermediate layer may be made of a material such as CoCr, CoCrB, CoCrPt, CoCrPtTa, and CoCrTa. The intermediate layer may be made of a nonmagnetic or a ferromagnetic material. The intermediate layer may comprise a plurality of layers. The intermediate layer is arranged so that crystal matching with the upper magnetic layer is improved away from the substrate towards the upper magnetic layer (for example, the content of Pt is increased away from the substrate towards the upper magnetic layer). In case where the intermediate layer is used, a film arrangement having an AFC structure may be represented by CoCr/CoCrPtTa/Ru/CoCrPtTa/CoCrPtB, CoCr/CoCrPtTa/CoCrPtTa/Ru/CoCrPtTa/CoCrPtB, and the like. The lower layer has a bcc structure and is mainly intended to improve a magnetostatic characteristic. For example, the lower layer may be made of a material such as Cr and a Cr alloy (for example, CrMo, CrV, CrW, and CrTi). The seed layer is intended to control the grain size of a layer formed thereon. For example, the seed layer may be made of a material such as NiAl, AlCo, CrTi, CrNi, and AlRu.

In case where the intermediate layer is formed, the intermediate layer preferably has a thickness between 5 and 50 angstroms. The thickness greater than 50 angstroms is not preferable because magnetic grains in the magnetic layer are increased in size so that the S/N ratio is decreased. The thickness smaller than 5 angstroms is not preferable because the function of adjusting the crystal orientation of the magnetic layer is insufficient.

In this case, CoCr or CoCrPtTa is advantageously used as the intermediate layer because the crystal matching with the magnetic layer is excellent. In order to further improve the crystal matching, the content of Cr contained in the intermediate layer is smaller than 22 at %. Thus, the above-mentioned function of the intermediate layer (adjusting the crystal orientation of the magnetic layer) is advantageously exhibited.

The material of the substrate is not specifically be restricted. Use may be made of aluminum, glass, glass ceramics, ceramics, silicon, carbon, titanium, and so on. In view of the smoothness of the surface of the substrate, the flatness, the mechanical strength, and the chemical durability, the glass substrate is preferable. Among various glass substrates, an amorphous glass is particularly preferable in controlling the crystals of the film formed on the substrate. As the amorphous glass, use may be made of aluminosilicate glass, borosilicate glass, soda lime glass, or the like. In case where the glass substrate is used, it is presumed that, if microscopically seen, the initial growth of the crystal grains exhibits distribution because the glass contains various components. Therefore, it is desired to include, as the underlying layer, at least a precoat layer controlling the crystal grains of the magnetic layer. Herein, "controlling the crystal grains" is addressed to the crystal grain size, the variation (variance) of the crystal grain size, and so on.

Use of an alloy containing Cr and Ta as the precoat layer is preferable because the characteristics such as output (LF: low frequency), the pulse width (PW), and the medium noise (S/N ratio) are remarkably excellent. As the alloy containing Cr and Ta, use may be made of CrTa and CrTaX (X: Ti, $O_2$). The alloy containing Cr and Ta is preferable because an amorphous structure or a substantially amorphous structure promotes the uniformity of initial growth of the crystal grains. In this case, the content of Ta preferably falls within a range between 30 and 80 at %.

DESCRIPTION OF THE PREFERRED EMBODIMENTS

Now, a magnetic recording medium according to this invention will be described in conjunction with specific examples.

EXAMPLE 1

Figure 1:
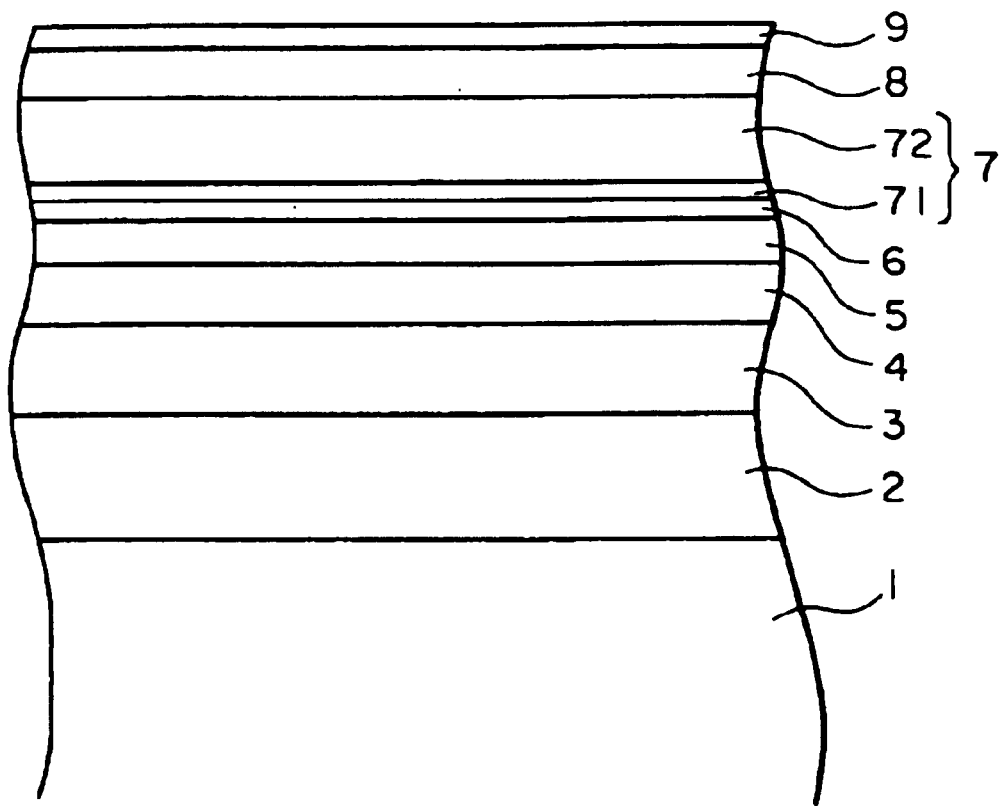
FIG. 1 shows a film structure of a magnetic recording medium according to an embodiment of this invention.

Referring to FIG. 1, illustration is made of a magnetic recording medium according to the Example 1. The magnetic recording medium according to the Example 1 includes a substrate (glass substrate) 1 on which a precoat layer 2, a seed layer 3, an underlying layer 4, a first magnetic layer 5, a spacer layer 6, a lower magnetic layer 71, an upper magnetic layer 72, a protection layer 8, and a lubrication layer 9 are successively laminated in this order. A combination of the substrate 1, the precoat layer 2, the seed layer 3, and the underlying layer 4 is referred to as a base body. A combination of the lower magnetic layer 71 and the upper magnetic layer 72 forms a second magnetic layer 7. The glass substrate is made of an aluminosilicate glass chemically strengthened and mirror-polished to surface roughnesses Ra=0.3 nm and Rmax=3.2 nm (measured by an inter-atomic force microscope).

The surface roughness Ra is representative of a center-line-mean roughness defined in Japanese Industrial Standard JIS B0601. The center-line-mean roughness Ra will now be described with reference to FIG. 2.

Figure 2:
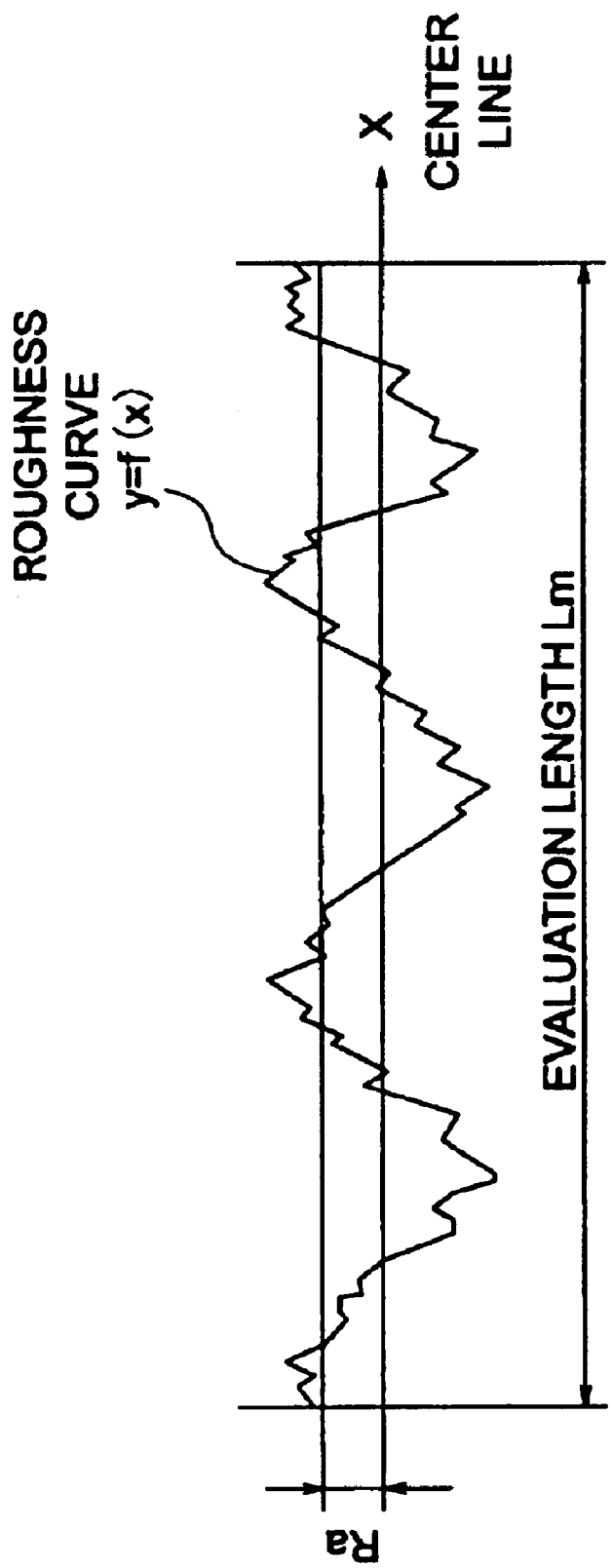
FIG. 2 shows a roughness curve for use in describing a center-line-mean roughness (Ra) used in describing the magnetic recording medium of FIG. 1.

A portion having an evaluation length Lm is sampled from a roughness curve illustrated in FIG. 2 along a direction of a center-line of the roughness curve. The center-line-mean roughness Ra is represented by the following equation:

$$Ra = \frac{1}{Lm} \int_0^{Lm} |f(x)| dx,$$

where the roughness curve is represented by y=f(x) when the center line of the sampled portion is defined as the X axis and when the direction of vertical magnification is defined as the Y axis.

That is, the center-line-mean roughness Ra is defined as a value which is obtained by integrating an absolute value of deviation between the center-line and the roughness curve by the section of the evaluation length into an integrated value and by averaging the integrated value with the section. In other words, the center-line-mean roughness Ra is defined as an average value of an absolute value of deviation between the center-line and the roughness curve.

The surface roughness Rmax is a maximum height representative of a difference between a highest point and a lowest point of the surface as also defined in Japanese Industrial Standard JIS B0601.

The precoat layer 2 comprises a CrTa amorphous layer (having a thickness of 300 angstroms). In this amorphous layer, the atomic ratio of Cr and Ta is 60:40. The seed layer 3 comprises an Al alloy film (having a thickness of 250 angstroms).

The underlying layer 4 comprises a CrW thin film (having a thickness of 100 angstroms) and is intended to improve a crystal structure of the first magnetic layer. The CrW underlying layer 4 has a composition ratio of Cr: 90 at % and W: 10 at %. The CrW underlying layer 4 is deposited by sputtering in a mixed gas atmosphere of 0.75% $CO_2$ and Ar in order to promote miniaturization of crystal grains of the CrW underlying layer 4.

The first magnetic layer 5 comprises a Co-based alloy thin film (having a thickness of 25 angstroms) of a ferromagnetic hcp structure.

The spacer layer 6 comprises a Ru film (having a thickness of 7 angstroms). The lower magnetic layer 71 comprises a CoCrPtTa alloy thin film (having a thickness of 5 angstroms). The contents of Co, Cr, Pt, and Ta are equal to 70 at %, 19 at %, 9 at %, and 2 at %, respectively.

The upper magnetic layer 72 comprises a CoCrPtB alloy thin film (having a thickness of 150 angstroms). The contents of Co, Cr, Pt, and B are equal to 61 at %, 20 at %, 12 at %, and 7 at %, respectively.

The protection layer 8 serves to prevent deterioration of the magnetic layer due to the contact with a magnetic head. The protection layer 8 comprises a hydrogenated carbon (or a carbon hydride) film having a thickness of 45 angstroms. The lubrication layer 9 comprises a liquid lubricator of perfluoropolyether. The lubrication layer 9 serves to buffer the contact with the magnetic head. The lubrication layer 9 has a thickness of 8 angstroms.

Next, description will be made of a method of producing the magnetic recording medium having the above-mentioned structure. At first, the glass substrate was chemically strengthened by low-temperature ion exchange. A principal surface of the glass substrate was subjected to precision polishing to produce a mirror surface (Rmax=3.2 nm, Ra=0.3 nm). Then, on the principal surface of the glass substrate, the precoat layer 2, the seed layer 3, the underlying layer 4, the first magnetic layer 5, the spacer layer 6, the lower magnetic layer 71, the upper magnetic layer 72, and the protection layer 8 were successively deposited by the use of a static opposed sputtering apparatus. The underlying layer 4 was deposited by sputtering in a mixed gas atmosphere of Ar+$CO_2$. The protection layer 8 was deposited by sputtering in a mixed gas atmosphere of Ar+$H_2$. The remaining layers were deposited by sputtering in an inactive gas atmosphere of Ar. Then, the perfluoropolyether lubricant was applied on the protection layer 8 by dipping to form the lubrication layer 9. Thus, a magnetic disk was obtained.

The magnetic disk thus obtained had the coercive force (Hc) of 3698 Oe, the coercive force squareness ratio (S*) of 0.65, the output (LF) of 1.52 mV, the pulse width (PW) of 12.3 nsec, the S/N ratio of 30.38 dB, the overwrite characteristic (OW) of −33.34 dB, and the thermal decay characteristic in terms of the signal output attenuation of 0.12-dB/decade. Thus, the thermal decay characteristic was excellent. In addition, excellent results were obtained for all of the recording/reproducing characteristics including the coercive force squareness ratio (S*), the pulse width (PW), the S/N ratio, and the overwrite characteristic (OW).

These characteristics were measured in the following manner. Also in following examples and comparative examples, measurement was made by the same methods. The coercive force (Hc) and the coercive force squareness ratio (S*) were measured by a magnetometer head (Hr/Mrt Disk Mapper manufactured by DMS Corporation). In view of the improvement in PW and thermal decay characteristic, the coercive force (Hc) is preferably as high as possible in a writing range of a head. The coercive force squareness ratio (S*) is an index representing in-plane orientation and magnetic separation between the magnetic grains. Generally, a higher value is preferable.

The output (LF) was measured by a read write analyzer (Guzik). As far as other electromagnetic conversion characteristics are maintained, the output (LF) is preferably as high as possible in improving the error rate. The pulse width (PW50: half width of an isolated signal waveform) was measured in the following manner. By the read write analyzer (Guzik) with an MR (magnetoresistive) head for PW50 measurement mounted thereon, an isolated reproduction signal was extracted. PW50 was obtained as the width of an isolated waveform at 50% of a peak value of the output signal with respect to ground (0).

For a high recording density, PW50 is preferably as small as possible. This is because a smaller pulse width allows a greater number of pulses (signals) to be written in a same area. On the other hand, a greater value of PW50 causes an interference between adjacent pulses (signals) to produce an error upon reading the signal. This waveform interference deteriorates the error rate.

The S/N ratio was obtained by measuring recording/reproducing outputs in the following manner. By the use of a MR head having a head flying height of 0.025 $\mu$m, the recording/reproducing outputs at a linear recording density of 520 kfcl (520000 bits/inch) were measured when the relative speed between the MR head and the magnetic disk is equal to 10 m/sec. At the carrier frequency of 100 MHz and the measuring band of 120 MHz, noise spectra upon the recording/reproducing operations were measured by a spectrum analyzer. The MR head used in this measurement had track widths of 2.0 and 0.5 $\mu$M m and magnetic head gap lengths of 0.20 and 0.11 $\mu$m on write and read sides, respectively. A higher S/N ratio prevents a signal reading error due to a noise to improve the error rate and achieves a high recording density.

The overwrite characteristic (OW) was similarly measured by the use of the read write analyzer (Guzik). The overwrite characteristic is preferably as high as possible in the sense of improving the degradation in yield due to an insufficient writing ability of the head upon assembling the HDD.

The thermal decay characteristic was measured in the following manner. In order to accurately evaluate only the signal attenuation due to the thermal decay of the magnetic recording medium without the influence of thermal-off-track (the phenomenon such that thermal expansion of a head suspension causes deviation of the magnetic head with respect to the track on the magnetic recording medium, resulting in signal attenuation), preparation is made of an MR head having a read/write device in which a write track width is at least twice a read track width. The MR head is set in a head/disk mechanism in a system together with the magnetic disk as the magnetic recording medium obtained as mentioned above. Then, the head/disk mechanism is put into an environmental tank controllable in temperature in order to expose the head/disk mechanism to a high-temperature environment. When the interior of the environmental tank is stabilized at a preselected temperature, a read/write circuit sends a write signal to a write device of the MR head to write the signal into the magnetic disk. Immediately after the signal is written, the signal written in the magnetic disk is read through a read device of the MR head, amplified by the read/write circuit, and then measured by a signal evaluating portion. The signal evaluating portion records an amplitude value of the read signal at a predetermined time interval. The signal evaluating portion carries out measurement, for example, by the use of a spectrum analyzer.

As the condition of the above-mentioned measurement, the environmental tank is kept at a temperature of 60° C. and the recording density of the signal written in the magnetic disk is 100 KFlux/inch. The head used in this measurement has a write track width of 2.0 $\mu$m, a read track width of 0.5 $\mu$m, a write gap length of 0.20 $\mu$m, a read gap length of 0.11 $\mu$m, and a read/write device floating height of 20 nm.

Comparative Example 1

Next, a magnetic recording medium was produced in the manner similar to Example 1 except the lower magnetic layer 71 in Example 1 is omitted. The magnetic disk thus obtained had a coercive force (Hc) of 3639 Oe, the coercive force squareness ratio (S*) of 0.54, the output (LF) of 1.39 mV, the pulse width (PW) of 12.6 nsec, the S/N ratio of 30.35 dB, the overwrite characteristic (OW) of −26.44 dB, and the signal output attenuation of 0.17-dB/decade as the thermal decay characteristic.

It will be understood that, as compared with the existing AFC structure, the film structure of this invention is excellent in thermal decay characteristic and particularly improved in coercive force squareness ratio (S*), pulse width (PW), and overwrite characteristic (OW). In particular, the magnetic disk is generally required to have the overwrite characteristic (OW) of −30 dB or more, desirably, −33 dB or more. It will be understood that writing was difficult in the existing AFC structure and that the structure of this invention achieves the overwrite characteristic (OW) in a sufficiently usable range.

Figure 3:
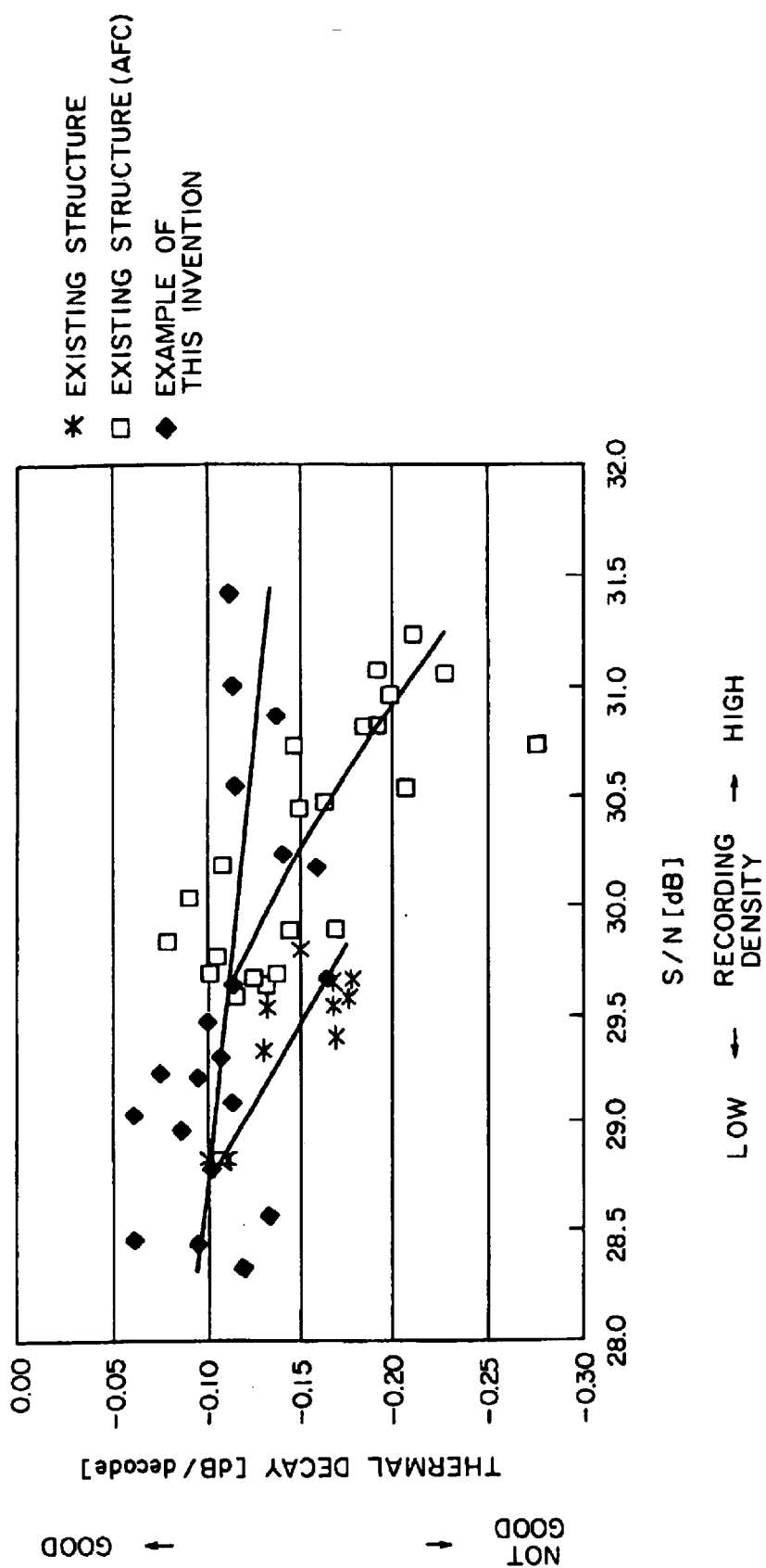
FIG. 3 is a graph showing the relationship between the S/N ratio and the signal output attenuation (Thermal Decay) in the magnetic recording medium of this invention, in comparison with reference and comparative examples.

Referring to FIG. 3, various magnetic recording media are evaluated for the relationship between the S/N ratio and the signal output attenuation (decay). In the figure, the symbols ♦, □, and * correspond to the magnetic disk having an AFC structure according to the example of this invention, the existing magnetic disk having an AFC structure, and the existing magnetic disk which does not have an AFC structure, respectively. The plotted values are obtained for each magnetic disk when the film material and the film composition of the underlying layer 4 or the magnetic layer are changed.

Generally, in order to increase the recording density, the improvement of the S/N ratio is essential. However, as seen from the graph, if the S/N ratio is improved (i.e., the magnetic grains are miniaturized) in case where the AFC structure is not used, the signal output attenuation is increased (thermal decay is deteriorated) so that the improvement of the S/N ratio is limited.

The allowance for the signal output attenuation is different in each drive maker. Generally, the signal output attenuation greater than −0.2 dB/decade is not acceptable. Therefore, the AFC structure has been proposed. However, even the existing AFC structure is insufficient in thermal decay characteristic and encounters the limitation in improvement of the S/N ratio. On the other hand, with the novel film structure of this invention, it is possible to achieve a thermal decay resistance characteristic with the S/N ratio improved. This shows that the recording density can further be improved. With respect to the limit of the existing AFC structure, the improvement in recording density corresponding to two generations is possible (in the magnetic disk, the improvement in S/N ratio required for one generation is about 2 dB).

Reference Example 1

Next, a magnetic disk was produced in the manner similar to Example 1 except that the lower magnetic layer 71 had a thickness of 80 angstroms and the upper magnetic layer 72 had a thickness of 70 angstroms. The result is shown in Table 1. As seen from Table 1, a greater thickness of the lower magnetic layer 71 than that of the upper magnetic layer 72 results in remarkable improvement in coercive force squareness ratio (S*) and overwrite characteristic (OW) as well as improvement in pulse width (PW) as compared with the existing AFC structure (Comparative Example 1) although the coercive force (Hc) is decreased.

magnetic layer 71 was changed as shown in Table 1 (the content of Ta was increased and the content of Pt was decreased). The results are shown in Table 1. As seen from Table 1, both of the Examples 4 and 5 are further improved in S/N ratio by the increase in content of Ta. In Example 4, the thermal decay characteristic and the overwrite characteristic (OW) were particularly improved by the decrease in

TABLE 1

| | Composition of Upper Magnetic Layer CoCrPtB | Composition of Lower Magnetic Layer CoCrPtX | Thickness of Lower Magnetic Layer (angstrom) | Hc (Oe) | S* | LF (mV) | PW (nsec) | O/W (-dB) | S/N (dB) | Thermal Decay (-dB/ decade) |
|---|---|---|---|---|---|---|---|---|---|---|
| Example 1 | 150 | 19-9-Ta2 | 5 | 3698 | 0.65 | 1.52 | 12.3 | 33.34 | 30.38 | 0.12 |
| Comparative Example 1 | 150 | — | 0 | 3639 | 0.54 | 1.39 | 12.6 | 26.44 | 30.35 | 0.17 |
| Reference Example 1 | 70 | 20-9-Ta3 | 80 | 3497 | 0.68 | 1.38 | 12.3 | 36.56 | 30.18 | 0.15 |
| Reference Example 2 | 150 | 21-13-Ta2 | 5 | 3601 | 0.55 | 1.96 | 12.2 | 38.59 | 30.15 | 0.16 |
| Example 2 | 150 | 21-9-Ta2 | 5 | 3672 | 0.63 | 1.48 | 12.4 | 33.46 | 30.45 | 0.13 |
| Example 3 | 150 | 19-11-Ta2 | 5 | 3746 | 0.66 | 1.49 | 12.2 | 33.19 | 30.21 | 0.11 |
| Example 4 | 150 | 18-0-Ta3 | 5 | 3637 | 0.54 | 1.39 | 12.4 | 34.33 | 31.23 | 0.09 |
| Examples | 150 | 18-8-Ta3 | 5 | 3681 | 0.64 | 1.30 | 12.2 | 32.82 | 31.05 | 0.13 |
| Reference Example 3 | 150 | 16-9-Ta2 | 5 | 3676 | 0.66 | 1.57 | 12.5 | 33.32 | 29.51 | 0.10 |
| Reference Example 4 | 150 | 19-9-Ta2 | 5 | 3186 | 0.52 | 1.31 | 12.5 | 39.01 | 29.64 | 0.12 |

Content of Ta (at %)
Content of Pt (at %)
Content of Cr (at %)

Reference Example 2

Next, a magnetic disk was produced in the manner similar to Example 1 except that the Cr concentration and the Pt concentration of the lower magnetic layer 71 are increased as shown in Table 1. The result is shown in Table 1. As seen from Table 1, a greater anisotropic magnetic field of the lower magnetic layer 71 than that of the upper magnetic layer 72 brings about remarkable improvement in overwrite characteristic (OW) although the thermal decay characteristic is substantially similar to that of the existing AFC structure Comparative Example 1

EXAMPLES 2 and 3

Next, magnetic disks were produced in the manner similar to Example 1 except that the Cr concentration of the lower magnetic layer 71 was changed (the saturated magnetic flux density of the lower magnetic layer 71 was changed) in Example 2 and that the Pt concentration of the lower magnetic layer 71 was changed (the anisotropic magnetic field of the lower magnetic layer 71 was changed) in Example 3. The results are shown in Table 1.

By changing the Cr concentration of the lower magnetic layer 71 in Example 2, the saturated magnetic flux density of the lower magnetic layer 71 is yet smaller than that of the upper magnetic layer 72 as compared with Example 1. Thus, with respect to the magnetic disk of Example 1, the overwrite characteristic (OW) and the S/N ratio are further improved. By changing the Pt concentration of the lower magnetic layer 71 in Example 3, the coercive force (Hc) and the thermal decay characteristic were improved.

EXAMPLE 4 and 5

Next, magnetic disks were produced in the manner similar to Example 1 except that the composition of the lower content of Pt although the coercive force squareness ratio (S*) was equivalent to that of the existing magnetic disk of the AFC structure (Comparative Example 1).

Reference Example 3

Next, a magnetic disk was produced in the manner similar to Example 1 except that the Cr concentration of the lower magnetic layer 71 was reduced as shown in Table 1. The result is shown in Table 1. As seen from Table 1, the anisotropic magnetic field of the lower magnetic layer 71 is smaller than that of the upper magnetic layer 72. However, the saturated magnetic flux density of the lower magnetic layer 71 is greater than that of the upper magnetic layer 72 so that the S/N ratio is deteriorated. As compared with the above-mentioned Examples 1–5, it will be understood that, when the anisotropic magnetic field of the lower magnetic layer 71 is smaller than that of the upper magnetic layer 72 and when the saturated magnetic flux density of the lower magnetic layer 71 is smaller than that of the upper magnetic layer 72, a magnetic disk excellent in thermal decay characteristic and excellent in coercive force squareness ratio (S*), pulse width (PW), overwrite characteristic (OW), and medium noise (S/N) is obtained.

Comparative Example 4

Next, a magnetic disk was produced in the manner similar to Example 1 except that the precoat layer 2 of an alloy containing Cr and Ta was not formed. The result is shown in Table 1. As will be understood from comparison with the data in the examples, by forming the precoat layer 2 made of the alloy containing Cr and Ta on the glass substrate, it is possible to improve the coercive force (Hc), the coercive force squareness ratio (S*), the pulse width (PW), and the S/N ratio.

EXAMPLE 6

Figure 4:
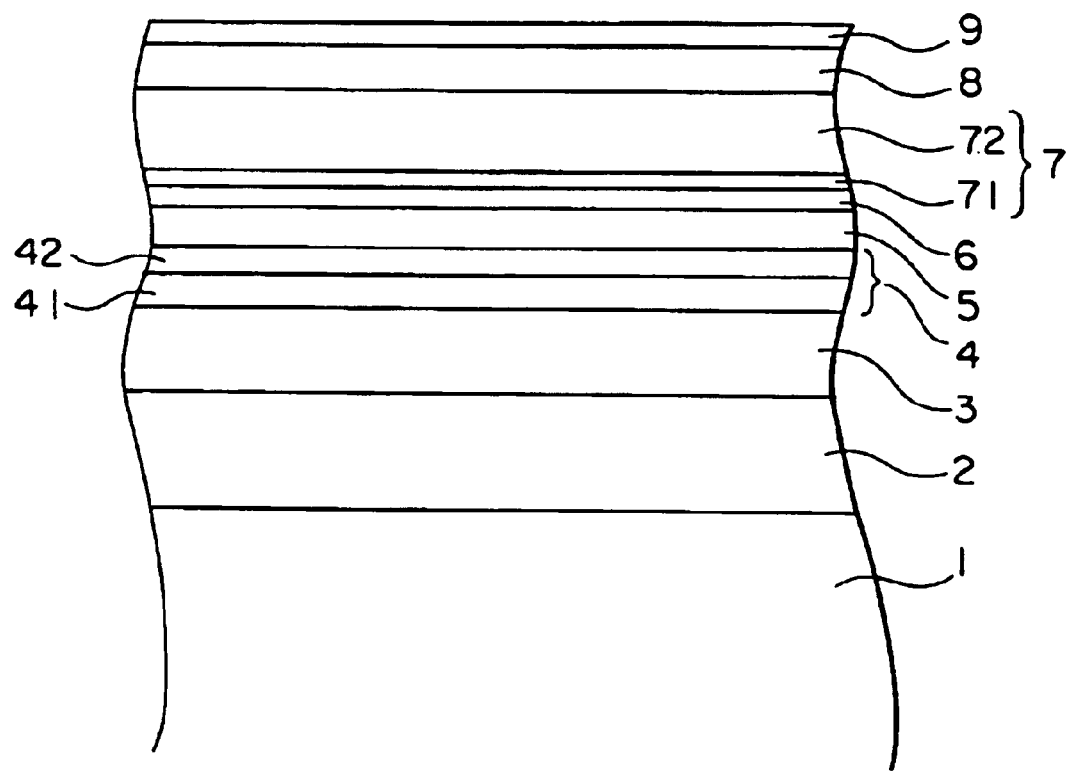
FIG. 4 shows a film structure of a magnetic recording medium according to another embodiment of this invention.

Referring to FIG. 4, illustration is made of a magnetic recording medium according to Example 6. In FIG. 4, the magnetic recording medium according to Example 6 was produced in the manner similar to Example 1 except that an intermediate layer 42 having a hcp (hexagonal close-packed) structure was interposed between a CrW thin film 41 (Cr: 90 at % and W: 10 at %) of the underlying layer 4 and the first magnetic layer 5. In this case, the intermediate layer 42 of the underlying layer 4 was made of a CoCrPtTa alloy having a composition of Co: 71 at %, Cr: 19 at %, Pt: 8 at %, and Ta: 2 at %. The intermediate layer 42 has a thickness of 10 angstroms. The intermediate layer 42 has the hcp structure and is intended to adjust the crystal orientation of the magnetic layer having the hcp structure. Except the presence of the intermediate layer 42, Example 6 is similar to Example 1. The CoCrPtTa alloy is a ferromagnetic material. As a result, the excellent characteristics were obtained, i.e., the coercive force (Hc) of 3668 Oe, the coercive force squareness ratio (S*) of 0.80, the output (LF) of 1.50 mV, the pulse width (PW) of 12.0 nsec, the overwrite characteristic (OW) of 33.21-dB, the S/N ratio of 29.79 dB, and the thermal decay of 0.07-dB/decade.

As compared with the result of Example 1, Example 6 is remarkably improved in coercive force squareness ratio (S*), pulse width (PW), and the thermal decay characteristic. Presumably, this is because the presence of the intermediate layer 42 serves to adjust the crystal orientation of the magnetic layer having the hcp structure.

EXAMPLE 7

A magnetic disk was produced in the manner similar to Example 6 of FIG. 4 except that an additional intermediate layer made of a CoCr alloy was interposed between the CrW thin film (Cr: 90 at % and W: 10 at %) 41 of the underlying layer 4 and the intermediate layer (Co: 71 at %, Cr: 19 at %, Pt: 8 at %, Ta: 2 at %) 42. The CoCr alloy had a composition of Co: 80 at % and Cr: 20 at %. The additional intermediate layer had a thickness of 25 angstroms.

In Example 7, the content of Pt is increased away from the substrate towards the upper magnetic layer 72 so that the crystal orientation with the magnetic layer is improved. Except this respect, Example 7 is similar to Example 1.

As a result, the excellent characteristics were obtained, i.e., the coercive force (Hc) of 3659 Oe, the coercive force squareness ratio (S*) of 0.81, the output (LF) of 1.48 mV, the pulse width (PW) of 12.0 nsec, the overwrite characteristic (OW) of 33.15-dB, the S/N ratio of 29.55 dB, and the thermal decay of 0.06-dB/decade.

As compared with Examples 1 and 6, the coercive force squareness ratio and the thermal decay characteristic are further improved. In addition, the crystal orientation of the magnetic layer is further improved.

EXAMPLE 8

Next, a magnetic recording medium according to Example 8 was produced in the manner similar to Example 1 of FIG. 1 except that a glass substrate having a surface roughness given by Rmax of 5.5 nm and Ra of 0.6 nm was used as the glass substrate 1. The surface roughness was measured by an inter-atomic force microscope (AFM).

The substrate with the spacer layer 6 formed last was measured for the surface roughness. As a result, the surface roughness was similar to that of the glass substrate 1 in this example.

The thermal decay was 0.13-dB/decade which is substantially equal to that of Example 1. Other characteristics than the thermal decay are also similar to those of Example 1.

EXAMPLE 9

Next, a magnetic recording medium according to Example 9 was produced in the manner similar to Example 1 of FIG. 1 except that a glass substrate having a surface roughness given by Rmax of 7.2 nm and Ra of 0.7 nm was used as the glass substrate 1.

The substrate with the spacer layer 6 formed last was measured for the surface roughness. As a result, the surface roughness was similar to that of the glass substrate 1 in this example.

The thermal decay was 0.16-dB/decade, which is considerably deteriorated as compared with Example 1. Other characteristics than the thermal decay were similar to those of Example 1.

Comparing the thermal decay characteristics in Examples 1, 8, and 9, it will be understood that the thermal decay characteristic is improved if the glass substrate 1 has the surface roughness given by Rmax of 6 nm or less and Ra of 0.6 nm or less. This is because the surface roughness of the spacer layer 6 inducing the antiferromagnetic exchange interaction is smoothed and flattened so that its function is uniform in a plane.

EXAMPLES 10–14

In order to investigate an advantageous composition of the first magnetic layer 5 of FIG. 1, magnetic recording media were produced with the composition of the first magnetic layer 5 adjusted as follows within a range of a Co-based alloy thin film having a ferromagnetic hcp structure.

The seed layer 3 in each of Examples 10 to 14 comprises an Al alloy thin film having a composition of Al: 50 at % and Ru: 50 at % and having a thickness of 250 angstroms.

Except the above, these Examples are similar to Example 1.

In Example 10, the first magnetic layer 5 has a composition of Co: 93 at % and Cr: 7 at %. In Example 11, the first magnetic layer 5 has a composition of Co: 90 at % and Cr: 10 at %. In Example 12, the first magnetic layer 5 has a composition of Co: 85 at % and Cr: 15 at %. In Example 13, the first magnetic layer 5 has a composition of Co: 80 at % and Cr: 20 at %. In Example 14, the first magnetic layer 5 has a composition of Co: 78 at % and Cr: 22 at %. In each Example, the thickness is equal to that in Example 1.

As a result, Examples 10 to 14 are similar in coercive force (Hc), coercive force squareness ratio, output (LF), pulse width (PW), overwrite characteristic (OW), and S/N ratio. On the other hand, the thermal decay characteristics are 0.10-dB/decade in Example 10, 0.11-dB/decade in Example 11, 0.12-dB/decade in Example 12, 0.12-dB/decade in Example 13, and 0.16-dB/decade in Example 14.

It will be understood that the thermal decay characteristic depends upon the content of Cr in the first magnetic layer 5 and that the thermal decay is discontinuously deteriorated when the content of Cr is 22 at % (Example 14).

Therefore, the material of the first magnetic layer 5 preferably contains Cr less than 22 at %. In case where Cr is less than 22 at %, the function of the first magnetic layer to control the antiferromagnetic exchange interaction is advantageously effective. On the other hand, if the content of Cr is equal to 22 at %, the function of controlling the antiferromagnetic exchange interaction is degraded. Therefore, in order to suppress the thermal decay, the first magnetic layer preferably has the Cr content less than 22 at %.

As described above, according to this invention, it is possible to obtain a magnetic recording medium excellent in thermal decay characteristic. Furthermore, it is possible to obtain a magnetic recording medium excellent in coercive force squareness ratio (S*) as well as in recording/reproducing characteristics (pulse width (PW), overwrite characteristic (OW), and medium noise (S/N)).

What is claimed is:

1. A magnetic recording medium comprising a base body (1-4), a first magnetic layer (5) formed on said base body, a second magnetic layer (7), and a spacer layer (6) formed between said first and said second magnetic layers, each of said first and said second magnetic layers being of a ferromagnetic material, said spacer layer being for inducing antiferromagnetic exchange interaction between said first and said second magnetic layers, said first magnetic layer being for controlling said antiferromagnetic exchange interaction, said second magnetic layer comprising a primary layer (72) and a secondary layer (71) located nearer to said base body than said primary layer, said primary layer having a primary anisotropic magnetic field, said secondary layer having a secondary anisotropic magnetic field which is smaller than said primary anisotropic magnetic field wherein said secondary layer (71) has a saturated magnetic flux density smaller than that of said primary layer (72).

2. A magnetic recording medium as claimed in claim 1, wherein said secondary layer (71) has a thickness smaller than that of said primary layer (72).

3. A magnetic recording medium as claimed in claim 1, wherein said spacer layer has a surface roughness Rmax of 6 nm or less and another surface roughness Ra of 0.6 nm or less, where Rmax is defined as a maximum height representative of a difference between a highest point and a lowest point and where Ra is representative of a center-line-mean roughness.

4. A magnetic recording medium as claimed in claim 1, wherein said spacer layer is made of a material comprising Ru.

5. A magnetic recording medium as claimed in claim 1, wherein said base body comprises a substrate (1) and an underlying layer (4) formed between said substrate and said first magnetic layer.

6. A magnetic recording medium as claimed in claim 5, wherein said underlying layer comprises an intermediate layer having an hcp (hexagonal close-packed) structure.

7. A magnetic recording medium as claimed in claim 6, wherein said intermediate layer is formed so that crystal matching or alignment with said primary magnetic layer is improved away from said substrate towards said primary magnetic layer.

8. A magnetic recording medium as claimed in claim 6, wherein said intermediate layer comprises a plurality of layers (41 and 42).

9. A magnetic recording medium as claimed in claim 8, wherein one layer (42) of said plurality of layers of the intermediate layer, that is nearest to said first magnetic layer, is made of a ferromagnetic material.

10. A magnetic recording medium as claimed in claim 5, wherein said substrate is a glass substrate.

11. A magnetic recording medium as claimed in claim 5, wherein said base body further comprises a precoat layer (2) formed between said substrate and said underlying layer for controlling crystal grains of said first and said second magnetic layers.

12. A magnetic recording medium as claimed in claim 11, wherein said precoat layer is made of an alloy comprising Cr and Ta.

\* \* \* \* \*